United States Patent [19]

Shieman

[11] Patent Number: 4,582,393
[45] Date of Patent: Apr. 15, 1986

[54] POLARIZING OPTICAL STEREOSCOPIC SYSTEM AND EYEPIECE USING TRIANGULAR PRISMS

[75] Inventor: David M. Shieman, Los Angeles, Calif.

[73] Assignee: Bright & Morning Star, CA., Lawndale, Calif.

[21] Appl. No.: 607,230

[22] Filed: May 4, 1984

[51] Int. Cl.$^4$ .............................................. G02B 27/26
[52] U.S. Cl. .................................... 350/132; 350/143; 358/91
[58] Field of Search ............................... 350/130–133, 350/143; 358/91, 88; 352/60, 61; 351/49

[56] References Cited

U.S. PATENT DOCUMENTS 4,400,067 8/1983 Joffe ...................................... 351/85

FOREIGN PATENT DOCUMENTS

| 1161128 | 1/1964 | Fed. Rep. of Germany | 350/132 |
| 540393 | 7/1922 | France | 350/133 |
| 655164 | 4/1929 | France | 350/132 |
| 1430187 | 1/1966 | France | 350/130 |
| 2272414 | 12/1975 | France | 350/131 |
| 503790 | 12/1954 | Italy | 350/133 |
| 543157 | 5/1956 | Italy | 350/130 |
| 614806 | 8/1959 | Italy | 350/132 |
| 480065 | 2/1938 | United Kingdom | 350/132 |

OTHER PUBLICATIONS

H. Asher et al., "Communications-Stereoscopy . . . ", Brit. J. Opthal. (1952) 36, 225–239.

Primary Examiner—Jon W. Henry
Attorney, Agent, or Firm—Robert E. Strauss

[57] ABSTRACT

An optical stereoscopic system is disclosed that permits viewing of adjacent stereoscopic images and that is particularly suited for room viewing, permitting the observer to move about the room, and/or several or more observers to view the display from various positions about the room. The system comprises a pair of light-polarized stereoscopic images which are displayed in adjacent array, i.e., laterally or vertically side-by-side. Each observer is provided with eyepieces to view the display. The eyepieces are binocular and each eyepiece includes a polarized filter and a prism which deviates the line of sight for its respective eye a sufficient degree that both stereoscopic images are fused in the fovea of the eye. Preferred embodiments provide interchangeable prisms, particularly interchangeable Fresnel prisms to permit changing of the diopter of the viewing prisms in the eyepieces. Fresnel prisms are particularly preferred since they provide lightness and reduced bulk and their use in eyepieces provides a tolerance to surface scratches and defects, thus providing a tolerance for wear and abuse of plastic prisms. With the Fresnel prism, a very preferred embodiment includes a laminated polarizing filter and Fresnel prism, as a single unit.

11 Claims, 7 Drawing Figures

POLARIZING OPTICAL STEREOSCOPIC SYSTEM AND EYEPIECE USING TRIANGULAR PRISMS

BACKGROUND OF THE INVENTION

1. Field of Invention

This invention relates to a stereoscopic viewing system and, in particular, to a system which is adaptable for electronic transmission of images and/or projection viewing to a plurality of observers.

2. Brief Statement of the Prior Art

Optical stereoscopic viewing systems have been known since practically the advent of photography. The major obstacle encountered in prior systems which has, heretofore, limited their use, has been the inability to confine the sight of each of the observer's eyes to a respective one of a pair of right and left stereoscopic images, while permitting these images to fuse into a single stereoscopic image to the observer. The earliest, hand-held viewers, solved this difficulty by spacially locating a pair of side-by-side stereoscopic images so close to the observer's eyes that each eye was physically limited to a single stereoscopic image. While this system successfully created a stereoscopic illusion, it was limited to a single observer using a hand-held viewer supporting the stereoscopic images and viewing system.

Attempts have been made to superimpose stereoscopic images onto a single polarizing screen. In this application, the pair of right and left images are polarized and projected onto a special screen that does not lose the polarization of the images which are superimposed on each other. When viewed through polarizing glasses, the illusion of a stereoscopic image is achieved. This system requires the use of elaborate photographic equipment, particularly a specialized polarizing projection system and screen and is not adaptable for electronic transmission, e.g., cannot be transmitted and viewed with television sets.

Some attempts have been made to achieve stereoscopic images with television transmission by use of color filters to view color encoded right and left stereoscopic images which are broadcast and viewed with conventional television equipment. The difficulty with this system is that is compromises both the stereoscopic illusion and the color quality of the images. Furthermore, color discriminate stereoscopic transmission requires the use of encoded filter lenses which if not available or not used results in off color, hazed-edge images. Preferably, a successful system should permit the viewer to see two-dimensional images without compromise of the image quality when the eyepieces, i.e., lenses or filters, are not worn.

BRIEF STATEMENT OF THE INVENTION

This invention comprises a stereoscopic viewing system in which right and left stereoscopic images are displayed in lateral or vertical side-by-side array. Each image is polarized and the observers wear eyepieces have a polarized filter and a prism with a diopter angle that is sufficient to diverge the line of sight of its respective eye so that its respective stereoscopic image is received on the fovea of the observer's eyes and fused by the observer into a single stereoscopic illusion. Because the stereoscopic images are displayed side-by-side, they can be transmitted in this fashion using conventional television transmission systems and can be viewed with an ordinary television set or television projection screen. Since the observer's eyes are blocked optically from the wrong image by the polarized filters, there is no necessity to position each observer at a very critical, close spacing to the images. Instead, the images can be projected on the wall of a large room and viewed from any location within the room. This permits a viewer to move about the room and several or more viewers to observe a single stereoscopic image display. An additional advantage is that this system can be used with existing stereoscopic films and photographs since the polarizing filters are between the image display and the observer.

BRIEF DESCRIPTION OF THE DRAWINGS

The invention will be described with reference to the figures of which.

DESCRIPTION OF PREFERRED EMBODIMENTS

Figure 1:
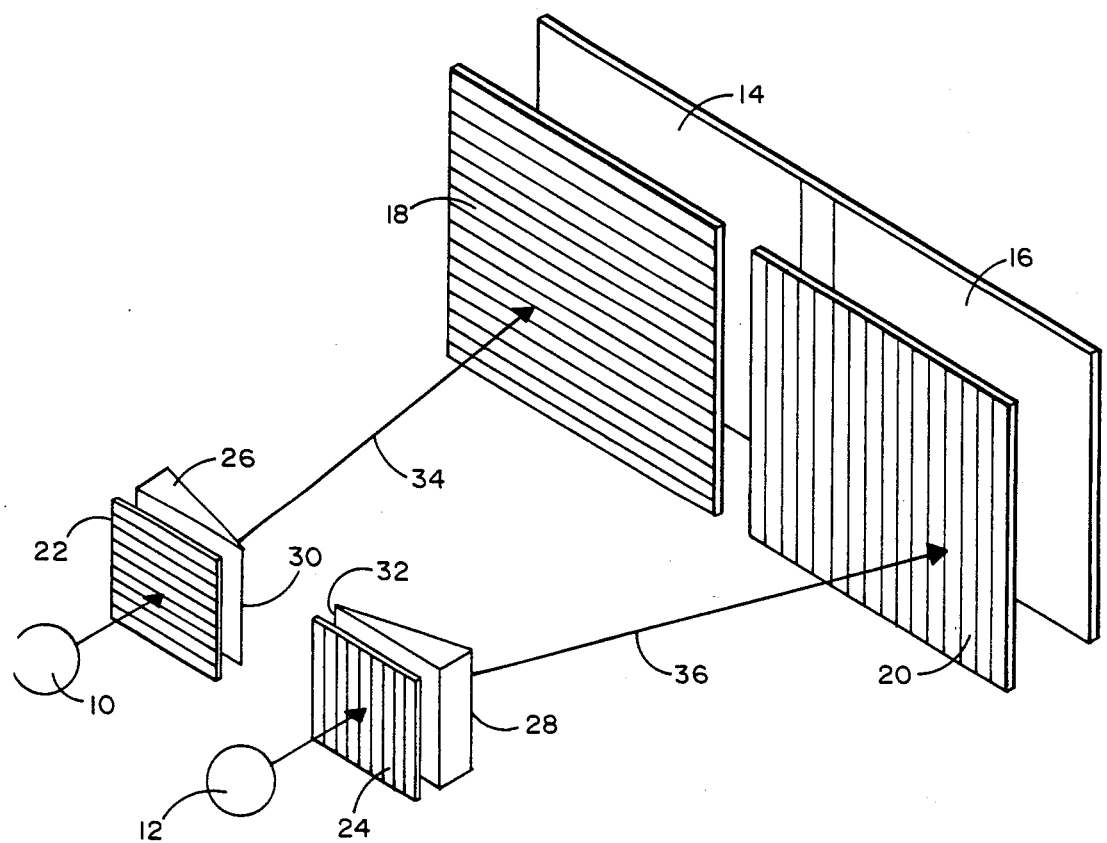
FIG. 1 illustrates the elements of the invention in the preferred, lateral side-by-side image array.

Referring now to FIG. 1, the elements of the invention are illustrated as applied to the eyes 10 and 12 of an observer. A pair of stereoscopic left and right images 14 and 16 are positioned in a side-by-side array for viewing by the observer. Each of the images is polarized by a respective polarizing filter or screen such as filters 18 and 20 which are positioned in front of their respective stereoscopic image. A corresponding polarizing filter is positioned in proximity to the observer's eyes 10 and 12 and these are shown as filters 22 and 24. For maximum effect, the polarizing filters are oriented at right angles in the illustrated manner. Also located in proximity to the observer's eyes 10 and 12 is at least one and, preferably two prisms 26 and 28 which are preferably positioned with their apex edges 30 and 32 pointed inwardly, with the result that the lines of sight 34 and 36 from each eye 10 and 12, respectively, are diverged outwardly in the illustrated manner.

Figure 2:
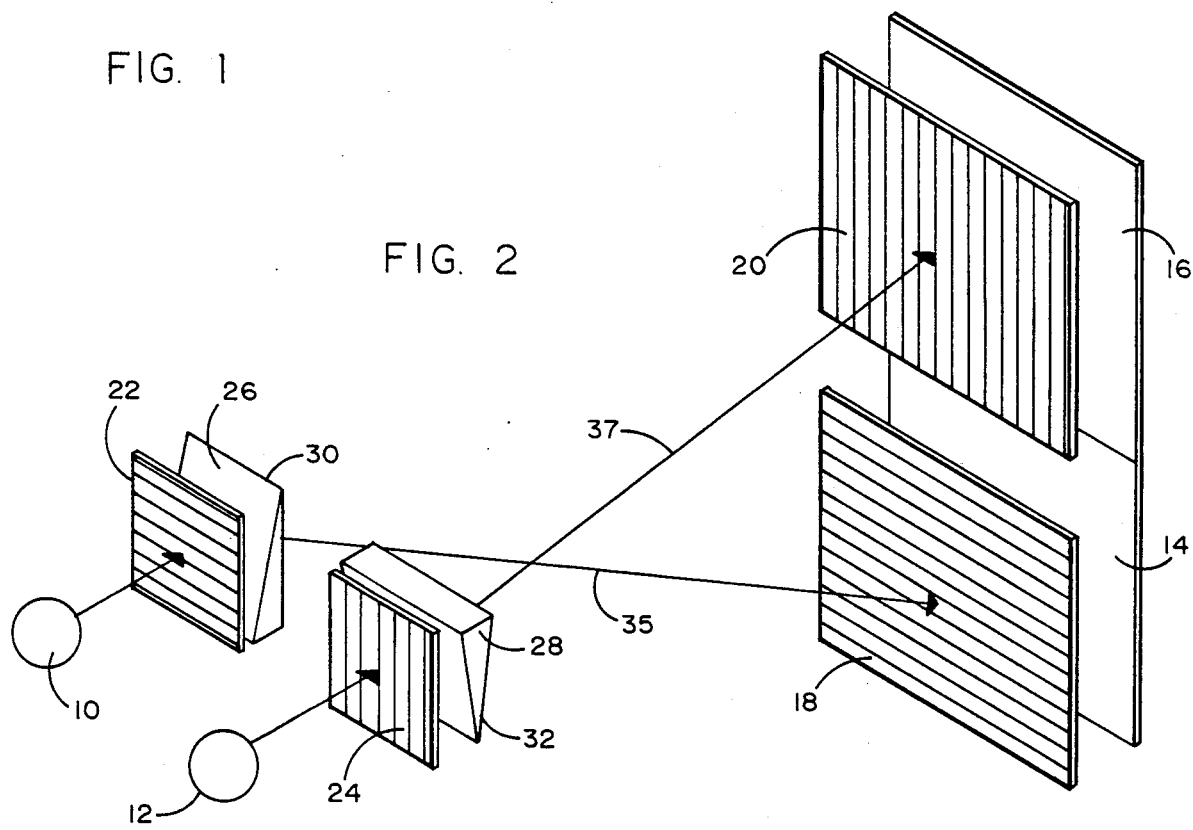
FIG. 2 illustrates the elements of the invention in a superimposed side-by-side array.

Referring now to FIG. 2, an alternate variant of the invention is illustrated. As there illustrated, the observer's eyes 10 and 12 are provided with adjacent polarizing filters 22 and 24, substantially as described with reference to FIG. 1. The pair of stereoscopic images 14 and 16, however, are displayed in a vertical or superimposed side-by-side array and the corresponding polarizing screens 18 and 20 are similarly positioned in a vertical array. The prisms 26 and 28 in this embodiment, however, are positioned to diverge the lines of sight from eyes 10 and 12 downwardly and upwardly, respectively and, for this purpose, the left prism 26 is positioned with its apex edge 30 pointed upwardly while prism 28 is positioned with its apex edge 32 pointed downwardly thus deflecting the lines of sight 35 and 37 in the illustrated manner.

Figure 3:
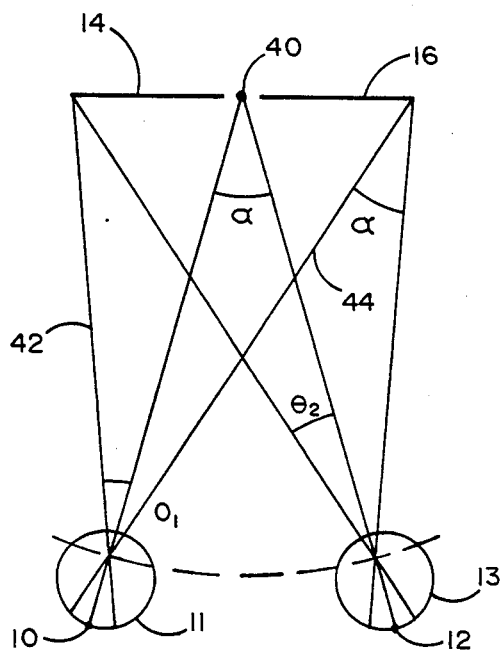
FIG. 3 illustrates the field of vision to an unaided observer.

Referring now to FIG. 3, there is illustrated an attempted display of stereoscopic images which does not achieve a stereoscopic illusion to the observer. This display comprises left and right stereoscopic images 14 and 16 which are positioned in a side-by-side array about a central point 40. The observer's eyes 10 and 12 have a sufficient field of vision to observe both of the stereoscopic images and this is illustrated with regard to the left eye 10 by lines 42 and 44 which sweep out a sufficiently wide arc to encompass both left and right images 14 and 16. Similarly, the right eye 12 has a sufficient field of vision such that both images are seen by this eye. While positioning of right and left polarizing filters in front of the images and also in front of the eyes 10 and 12 in the manner described with reference to FIGS. 1 and 2 will block observation of each of the other images to the respective eyes, a stereoscopic illusion is not achieved because the images are not fused, i.e., are not received at coacting locations on the retina 11 and 13 of each of the eyes 10 and 12. The result is that the viewer must either cross his eyes to fuse the stereoscopic images or view uncoordinated right and left images, without a stereoscopic illusion.

Figure 4:
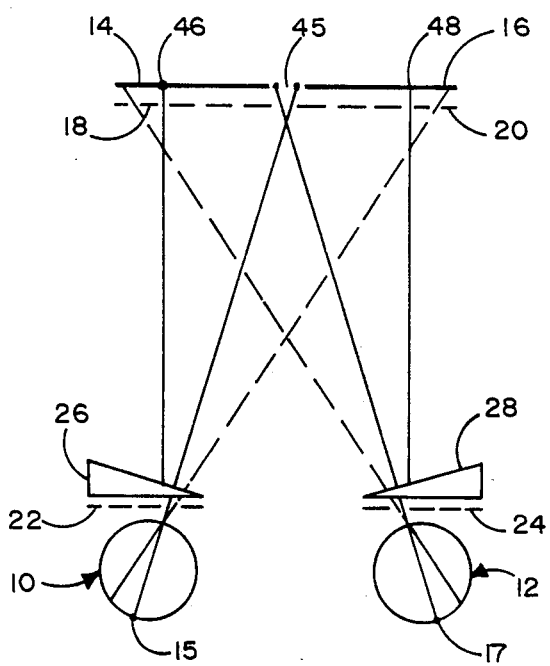
FIG. 4 illustrates the field of vision to an observer using the invention.

Referring now to FIG. 4, the system there illustrated is substantially the same as that of FIG. 3 with the exception that the prisms 26 and 28 have been positioned in front of their respective eyes 10 and 12 and polarizing filters 18 and 20 are positioned in front of the images with cooperative polarizing filters 22 and 24 in front of the observer's eyes. The result is that the center point 45 located between the left and right images 14 and 16 is shifted to the left to the point 46 for the left eye 10 and is shifted to the right to point 48 for the right eye 12. This permits the reception of each of the left and right images at the fovea centralis 15 and 17, for each of the eyes, 10 and 12, respectively, and a stereoscopic image is achieved.

As apparent from the preceding diagrams, the stereoscopic illusion can be achieved from a wide variety of angles and various distances from the display of the stereoscopic images. This readily permits observers to move freely about the display without losing the stereoscopic illusion. Preferably, however, some adjustability of the diopter angle of the viewing prisms 22 and 24 is provided. This provides a greater freedom of movement by the observers since it permits the observers a great latitude in distance from the display of the stereoscopic images. As this distance increases, the required diopter angle of the prisms 20 and 22 decreases and the binocular eyepiece employed by the observers preferably has adjustable means to permit variation in this diopter angle of the prism.

Figure 5:
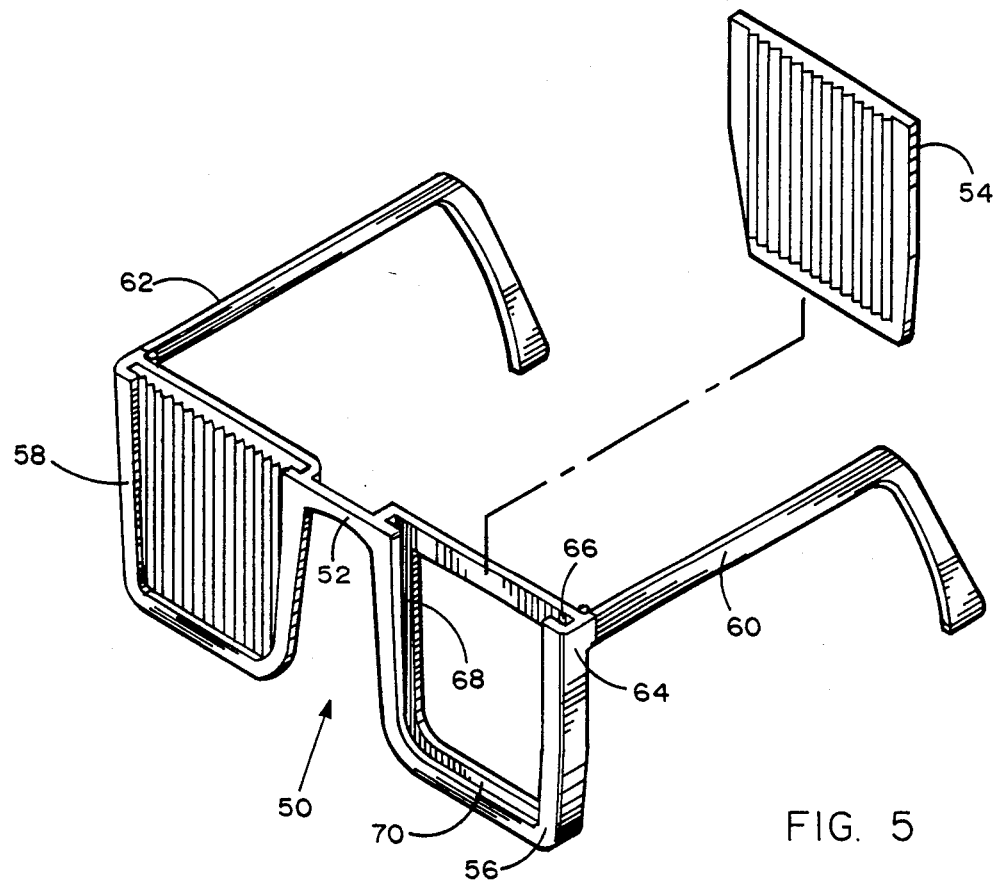
FIG. 5 is a perspective view of a suitable binocular eyepiece useful in the invention.

Referring now to FIG. 5, a suitable embodiment of the preferred eyepieces used in the invention is illustrated. The eyepiece 50 has a frame 51 with a pair of mounting subframes 56 and 58 dependent from the nose bridge 52 and supporting temples 60 and 62 by laterally disposed hinges 64, the latter being conventional in construction and operation. Each subframe is formed of upright and opposite channels 66 and 68 with a lower, horizontal channel 70, thereby providing a keyway for receiving removable prisms and filters. Each binocular eyepiece such as 54, has right and left polarizing filters 76 (see FIG. 6) with right and left Fresnel prisms. The right and left prisms and filters are removably mounted in their respective subframes 56 and 58, and the assembly preferably includes a plurality of such interchangeable filters and prisms which have varied diopter values, for use in a manner described more fully hereinafter.

Figure 6:
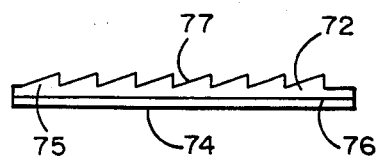
FIG. 6 is a top view of a laminated Fresnel prism and polarizing filter.

Referring now to FIG. 6, there is illustrated a top view of the preferred laminated Fresnel prism and polarizing filter. Each such laminated assembly includes a flat transparent face 74, a thin, light-polarizing film 76, and a Fresnel prism 72, which are laminated into an unitary prism-filter element.

In FIG. 6, the prism 72 for the left eye is illustrated, with the scale for the prisms greatly expanded for illustration purposes. This prism is a Fresnel prism and has a series of closely spaced grooves 77 on one side, similar to the arrangement and spacing of the grooves of a cylindrical Fresnel prism, however, the grooves are straight, parallel grooves rather than concentric circles as in a cylindrical Fresnel. These grooves provide prisms having face angles 75 which are from 1 to about 45 degrees, preferably 5 to about 20 degrees for most viewing, however viewing from locations which are very close to the screen could require use of prisms having face angles up to about 40 degrees. The polarizing film is formed of conventional light polarizing crystals such as calcite mineral crystals which are oriented electromagnetically in the film 76, or on the interface between the laminated pieces, Fresnel prism 72 and the flat plate 74. If desired, a magnification capability can be provided in the structure, simply by providing a convex curvature to the outer surface of plate 74. The grooves can be provided at sufficiently close spacing to achieve from 25 to 500 grooves per inch; preferably from 50 to 200 grooves per inch, sufficient to provide adequate sharpness of resolution for general viewing purposes.

The observer simply selects the prism-filter occular piece which provides the necessary diopter angle for the observer's distance from the image display. If the prism selected has an improper diopter angle for the observer's position, the observer simply removes the occular piece and replaces it with one having the correct diopter angle, as determined when the images which are observed are clear and sharply defined. A plurality of Fresnel prisms are provided with each eyepiece and the size and spacing of the prisms on the faceted face of each Fresnel prism varies from those of the other prisms in a regular, progressive manner, i.e., from the smallest and most closely spaced prism facets to larger facets with greater spacing progressively in a set of from 3 to about 10 prism sets. Each prism with a varied diopter angle is, of course, supplied in a set of left and right occulars, each with its respective left and right light polarizing filters.

Alternatively, a plurality of eyepieces can be provided with permanently installed prisms and each stereoscopic display system can be provided with a plurality of eyepieces in which the diopter angle is varied, to permit the observers to select the eyepiece having the desired diopter angle for sharp vision at his location.

Figure 7:
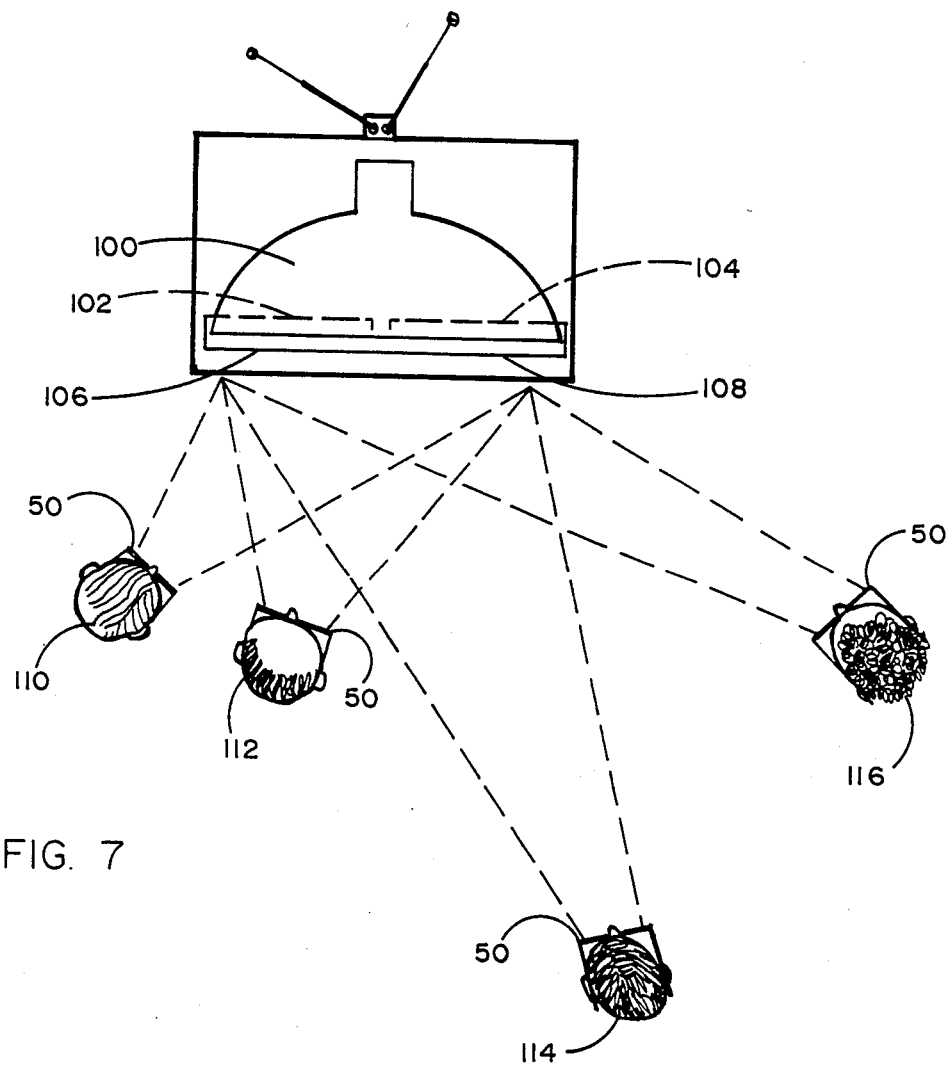
FIG. 7 is a view of a television embodiment of the invention.

Referring now to FIG. 7, there is illustrated a plan view of a typical stereoscopic system of the invention. The stereoscopic images are displayed in a side-by-side array on a television set 100 and there appear as images 102 and 104. Positioned in front of the television set is a pair of polarizing light filters 106 and 108. Each of the viewers 110, 112, 114 and 116 have a pair of the binocular eyepieces 50, previously described. The observers can position themselves about the television set 100 at various distances and angles from this set and can observe the two stereoscopic images with each of their respective eyes, the corresponding polarizing filters such as 62 and 64 of their binocular eyepieces (see FIG. 5) are effective to block the vision of the opposite stereoscopic image to each of the observer's eyes. Each observer can independently adjust the diopter angle of the binocular eyepiece worn by that observer to adjust for the necessary divergence of the view sufficiently to fuse the observed stereoscopic images at the fovea centralis of the observer's eyes, thereby creating a stereoscopic illusion.

While the invention has been described with polarized light, it could also be used with color-encoded light for each of the left and right stereoscopic images (anglyph systems). In this modification the glasses would be provided with color filters corresponding to the color used to encode its corresponding image, e.g., right-red and left-blue combinations, could be used.

The invention offers the advantage of permitting side-by-side display of stereoscopic images and thus can be readily adapted for television transmission and viewing, and avoids specialized light polarizing screens which are necessary when the stereoscopic images are superimposed. Existing stereoscopic films can be used for the image source, since polarized images are not required, as the necessary polarization of each stereoscopic image is accomplished at the viewing system. Each of the stereoscopic images can be displayed in full color for faithful color reproduction without compromising the color of these images as is experienced with the previous monochromatic color filters and color imagery used in previous attempts for television three dimensional transmission and viewing. Additionally, the system permits viewing from a wide variety of incident angles to the image display and at greatly varied distances from the display. This is particularly the case when the observer's use the preferred binocular eyepieces which have the adjustment capability to vary the diopter angle of the prisms in the eyepiece.

The invention provides for a very useful application of Fresnel prisms, as the prisms are employed in an eyepiece and are positioned very close to the observer's eyes. Minor imperfections in the prisms, such as surface scratches and blemishes are not detected by the observer. This permits the use of very light and inexpensive plastic prisms since there is a considerable tolerance to wear and abuse of the prisms before the image observation is compromised.

The invention has been described with reference to the illustrated and presently preferred embodiments. It is not intended that the invention be unduly limited by this illustration of the presently preferred embodiments. Instead, it is intended that the invention be defined by their means, and their obvious equivalents, set forth in the following claims.

What is claimed is:

1. A stereoscopic viewing system comprising:
   (a) a pair of right and left stereoscopic images of a subject positioned in a side-by-side array;
   (b) light polarizing filters positioned in front of said images; and
   (c) an eyepiece worn by an observer having:
   (i) left and right frames with respective right and left light polarizing filters positioned in front of the observer's eyes corresponding to the filters in front of their respective images, and
   (ii) right and left prisms also positioned in front of the observer's eyes each of said prisms being a thin face prism having a flat side and a faceted face which has a plurality of straight parallel V-grooves to form therebetween a plurality of straight parallel triangular prisms having a diopter angle sufficient to diverge the line of sight from said eye sufficiently to merge its respective image on its fovea centralis;

thereby creating a stereoscopic illusion.

2. The stereoscopic viewing system of claim 1 wherein said images are a televideo display.

3. The stereoscopic viewing system of claim 1 wherein the face angle of the triangular prisms is from 1 to about 45 degrees with the plane of the prism.

4. The stereoscopic viewing system of claim 1 wherein the prisms are spaced from 25 to about 500 prisms per inch.

5. The stereoscopic viewing system of claim 1 wherein the prisms are spaced from 50 to about 200 prisms per inch.

6. The stereoscopic viewing system of claim 1 wherein said frames provide an occular track to receive removeable subassemblies of filters and prisms, permitting the viewer to interchange said subassemblies to vary the diopter angle.

7. The stereoscopic viewing system of claim 6 wherein said subassemblies are laminated plates comprising a flat transparent plate; a faceted plate having a smooth side opposite one side of said flat plate; and a thin layer of light polarizing film received between and bonded to both said flat and faceted plates.

8. An eyepiece to be worn by an observer to create the illusion of stereoscopic vision with right and left stereoscopic images which comprises:
   (a) eyepiece frames comprising left and right occular frames having channel tracks to receive removeable subassemblies of filters and prisms; and
   (b) right and left occulars subassemblies comprising a laminated assembly of a flat transparent plate; a faceted plate having a smooth side opposite one side of said flat plate and a plurality of straight parallel V-grooves on its faceted face to form therebetween a plurality of straight parallel triangular prisms; and a thin layer of light polarizing film received between and bonded to both said flat and faceted plates.

9. The eyepiece of claim 8 wherein the face angle of the triangular prisms is from 1 to about 45 degrees with the plane of the prism.

10. The eyepiece of claim 8 wherein the prisms are spaced from 25 to about 500 prisms per inch.

11. The eyepiece of claim 8 wherein the subassemblies are placed in the eyepiece frames with the apex edges of said parallel prisms on the faceted face of the subassemblies medially oriented.

* * * * *